Sept. 12, 1967  L. D. LOCH  3,341,473
HIGH BETA THERMISTORS

Filed Feb. 16, 1966  2 Sheets-Sheet 1

INVENTOR.
LUTHER D. LOCH
BY
H.W. Brownell
ATTORNEY

Sept. 12, 1967  L. D. LOCH  3,341,473
HIGH BETA THERMISTORS
Filed Feb. 16, 1966  2 Sheets-Sheet 2

INVENTOR.
LUTHER D. LOCH
BY
*K. E. S. Brownell*
ATTORNEY

United States Patent Office  3,341,473
Patented Sept. 12, 1967

3,341,473
HIGH BETA THERMISTORS
Luther D. Loch, Youngstown, N.Y., assignor to Carborundum Company, Niagara Falls, N.Y., a corporation of Delaware
Filed Feb. 16, 1966, Ser. No. 534,588
8 Claims. (Cl. 252—520)

This application is a continuation-in-part of copending application Ser. No. 324,915, filed Nov. 20, 1963, now abandoned.

The invention of the present application relates to thermistors and is particularly concerned with novel thermistor bodies which are usable at relatively high temperatures.

Thermistors are thermally-sensitive resistors. They may have either a positive or a negative coefficient of resistance depending upon a number of factors such as the composition of the body, although bodies with negative coefficients are more generally used. The thermistors previously available commercially have, in most cases, been satisfactory for certain specific purposes but have not been suitable for use at elevated temperatures.

It is, therefore, an object of the present invention to provide thermistors that may be used over temperature ranges above those presently considered feasible.

Another object of the invention is to provide novel compositions for thermistor bodies.

A further object of the invention is to provide apparatus for temperature-sensing applications at elevated temperatures.

Another object of the present invention is to provide thermistors which have resistivities at 150° C. and at 600° C. such that the ratio of the former to the latter is high.

Still another object of the present invention is to provide thermistor bodies that have novel and useful electrical properties.

Other objects and advantages of the present invention will be apparent from the following description thereof taken in conjunction with the accompanying drawings in which.

Figure 1:
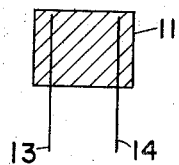
FIGURES 1 and 2 illustrate two of the numerous forms that thermistors according to the present invention may take.

It has been found that thermistors suitable for use at temperatures up to 1000° C. and, in some cases, to higher temperatures may be produced from certain ceramic mixtures. Thermistors according to the invention are particularly useful for temperature-sensing applications in the temperature range from about 300° C. to about 1000° C. Such thermistors have a negative temperature coefficient of resistance and may be characterized as having a resistivity at 600° C. of not more than about $5 \times 10^4$ ohm-cm. and a resistivity ratio (hereinafter referred to as "RR") of from about $3 \times 10^1$ to $4 \times 10^7$. The resistivity ratio (RR) is the ratio of resistivity, in ohm-cm. of a body at 150° C. to the resistivity of the body at 600° C. and is an indication of the rate of change of resistivity over this temperature range.

The thermistors made according to this invention are further characterized in that the percent change in resistance per degree C. of the bodies is relatively high, being on the order of 0.5 percent or greater. This factor is calculated according to the following formula:

$$\text{Percent } \Delta R/^\circ \text{ C.} = \left[\frac{\frac{R-R'}{R} \times 100}{^\circ\text{C.} - ^\circ\text{C.}'}\right]$$

where R is resistance in ohm-cm. measured at 275° C. and R' is ohm-cm. measured at 300° C.; ° C. is 300 and ° C'. is 275.

The ceramic bodies employed in producing thermistors according to the present invention are bodies which are, in general, solid solutions of the oxides of tin and titanium. Included essentially in the bodies are small but effective amounts, of the order of 5 mol percent or less, of at least one metal oxide that serves as a resistance modifier.

Bodies suitable for thermistor use in this invention, those, that is, which comprise mainly solid solutions of stannic oxide and titanium dioxide, are of particular interest since they can be operated at temperatures up to about 1000° C. and they have easily measurable resistance at elevated temperatures, a high ratio of resistivity (RR) and a relatively high percent resistivity change per degree C. Examples of the production of thermistors of this type are given below.

EXAMPLE 1

A mixture of finely divided $SnO_2$ and $TiO_2$ was prepared, the $SnO_2$ constituting 85 mol percent and the $TiO_2$ constituting 15 mol percent of the mixture. To this basic mixture was added 0.5 mol percent (calculated with respect to the basic mixture) of antimony trioxide as a resistance modifier. The $Sb_2O_3$ was also in finely divided form. The powders were blended, wet milled for 2 hours to obtain thorough mixing, and dried. The dried mixture was rubbed through a number 20 standard sieve, thoroughly mixed with 2 weight percent dry dextrine, moistened with enough water to give desirable molding properties and then pressed into small bars under a pressure of 6000 p.s.i. In pressing the bars the oxide mixture was molded around wire electrodes placed in the mold adjacent the ends of the bars. These electrodes were formed of 0.0125 inch diameter platinum wire. The molded bars were then placed on a suitable support in an electrically heated ceramic kiln and fired to about 1300° C. at approximately 200°C./hour in an oxidizing atmosphere. The bars were maintained at about 1300° C. for 10 hours and were then cooled and tested. Tests for resistivity at various temperatures were carried out at 1 kc. with a bridge using alternating current. The resistivity at 150° C. was found to be $4.63 \times 10^6$ ohm-cm. and the resistivity at 600° C. was found to be $6.18 \times 10^3$ ohm-cm. The resistivity ratio (RR) is, therefore, $7.49 \times 10^2$. The percent resistivity change was 1.39 per degree C.

EXAMPLE 2

A thermistor having a body consisting principally of a solid solution of $SnO_2$ and $TiO_2$ was produced in the same manner as described in the preceding example. The metal oxide mixture employed was also the same except that 3 mol percent of zinc oxide (calculated with respect to the basic mixture of $SnO_2$ and $TiO_2$) was added as a stabilizer. The resulting thermistor had resistivities at 150° C. and 600° C., respectively, of $4.28 \times 10^6$ and $7.49 \times 10^2$ and a RR of $5.71 \times 10^3$. Percent resistivity change per degree C. was 1.22.

EXAMPLES 3–5

Using the same basic mixture of 85 mol percent $SnO_2$ and 15 mol percent $TiO_2$, other solid solution thermistor bodies were produced which contained as modifying oxides 3 mol percent of zinc oxide and a small amount of antimony trioxide or tantalum pentoxide as a resistance modifier. The procedure employed was the same as that described in connection with Example 1. When tested, the bodies were found to have resistivities and ratios of resistivity as follows:

| Example | Additive, mol percent | Resistivity in ohm/cm. | | RR | Percent $\Delta R/°$ C. |
|---|---|---|---|---|---|
| | | 150° C. | 600° C. | | |
| 3 | 0.5 Ta$_2$O$_5$ | 4.72×10$^7$ | 6.82×10$^2$ | 6.92×10$^4$ | 2.15 |
| 4 | 0.2 Ta$_2$O$_5$ | 5.76×10$^5$ | 5.76×10$^1$ | 1.0×10$^4$ | 2.19 |
| 5 | 0.2 Sb$_2$O$_3$ | 3.09×10$^7$ | 1.33×10$^2$ | 2.32×10$^5$ | 2.53 |

EXAMPLES 6–10

In these examples the basic mixture of oxides used in forming the solid solution thermistor bodies was a mixture of 60 mol percent SnO$_2$ and 40 mol percent TiO$_2$. As a resistance modifier 0.5 mol percent of Sb$_2$O$_3$ (calculated with respect to the basic mixture) was used along with varying amounts of ZnO as shown below for stabilization.

| Example | Additive, mol percent | Resistivity in ohm/cm. | | RR | Percent $\Delta R/°$ C. |
|---|---|---|---|---|---|
| | | 150° C. | 600° C. | | |
| 6 | 0 ZnO | 5.3×10$^4$ | 1.49×10$^3$ | 3.53×10$^1$ | 1.86 |
| 7 | 1 ZnO | 1.45×10$^9$ | 3.13×10$^3$ | 4.63×10$^5$ | 2.43 |
| 8 | 3 ZnO | 2.56×10$^6$ | 8.56×10$^2$ | 3.0×10$^3$ | 1.78 |
| 9 | 5 ZnO | 3.48×10$^7$ | 7.54×10$^5$ | 4.61×10$^1$ | 2.26 |
| 10 | 10 ZnO | 7.49×10$^7$ | 1.92×10$^3$ | 3.90×10$^4$ | 1.44 |

In producing the thermistors of these examples the same procedure was used as that described in Example 1.

EXAMPLES 11–15

In the following examples the basic mixture of oxides employed in making the thermistor bodies was composed of 40 mol percent SnO$_2$ and 60 mol percent TiO$_2$. The examples comprehend the use in varying percentages, with and without zinc oxide, of Sb$_2$O$_3$ and Ta$_2$O$_5$ as resistance modifiers. Substantially the same procedure as described in Example 1 was followed in producing the solid solution thermistors described below.

| Example | Additive, mol percent | Resistivity in ohm/cm. | | RR | Percent $\Delta R/°$ C. |
|---|---|---|---|---|---|
| | | 150° C. | 600° C. | | |
| 11 | 1.0 Ta$_2$O$_5$ | 1.36×10$^8$ | 6.93×10$^3$ | 1.96×10$^4$ | 2.63 |
| 12 | 5.0 Ta$_2$O$_5$ | 9.45×10$^7$ | 5.98×10$^3$ | 1.58×10$^4$ | 0.76 |
| 13 | 1.0 Ta$_2$O$_5$; 3 ZnO. | 1.39×10$^9$ | 1.71×10$^4$ | 8.12×10$^4$ | 2.70 |
| 14 | 1.0 Sb$_2$O$_3$; 3 ZnO. | 2.94×10$^7$ | 1.57×10$^3$ | 1.87×10$^4$ | 2.29 |
| 15 | 2.0 Sb$_2$O$_3$; 3 ZnO. | 5.04×10$^7$ | 2.57×10$^3$ | 1.96×10$^4$ | 2.06 |

In these examples, as in the others, the mol percentages of the additives were calculated individually with respect to the basic mixture.

EXAMPLES 16–17

These examples are concerned with oxidic solid solution thermistors, the basic mixtures for which contain 20 mol percent SnO$_2$-80 mol percent TiO$_2$. In both examples 3 mol percent ZnO (calculated with respect to the basic mixture) was employed as a stabilizer, along with Sb$_2$O$_3$ in Example 16 and with Ta$_2$O$_5$ in Example 17 as resistance modifiers.

| Example | Additive, mol percent | Resistivity in ohm/cm. | | RR | Percent $\Delta R/°$ C. |
|---|---|---|---|---|---|
| | | 150° C. | 600° C. | | |
| 16 | 2 Sb$_2$O$_3$ | 5.2×10$^9$ | 1.7×10$^4$ | 3.05×10$^5$ | 2.96 |
| 17 | 2 Ta$_2$O$_5$ | 1.89×10$^9$ | 1.62×10$^4$ | 1.17×10$^5$ | 2.77 |

The same procedure as described in Example 1 was used in producing the bodies of these examples.

EXAMPLE 18

Using the same procedure as described in Example 1, a solid solution thermistor body employing a basic mixture of 98 mol percent SnO$_2$ and 2 mol percent TiO$_2$ was prepared. The body included 0.2 mol percent (calculated with respect to the basic mixture) of antimony trioxide which acted as a resistance modifier. The resultant thermistors showed a resistivity in ohm/cm. at 150° C. and 600° C., respectively, of 1.13×10$^3$ and 9.8×10$^0$. The resistivity ratio (RR) is, therefore, 1.15×10$^2$. The percent resistivity change per degree C. was 1.09.

EXAMPLE 19

For comparison with the thermistors of the foregoing examples a body was prepared using only stannic oxide as the major constituent and containing 3 mol percent ZnO and 0.2 mol percent Sb$_2$O$_3$ (calculated with respect to the SnO$_2$) as modifying oxides. The resistivity in ohm/cm. of this body was 1.6×10$^2$ and 2.0×10$^0$ at 150° C. and 600° C., respectively, and the resistivity ratio (RR) was 8×10$^1$. Although the percent resistivity change per degree C. is 1.33, the potential usefulness of such bodies as thermistors is substantially non-existent because of the very low high temperature resistivity accomplished by a very low resistivity ratio.

The following examples illustrate some of the various other metal oxides that may be used to form thermistors according to this invention.

Figure 2:
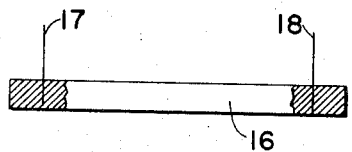

As stated above in the drawings FIGURES 1 and 2 exemplify two of the many forms in which thermistors in accordance with the present invention may be formed. In FIGURE 1 a pellet-shaped thermistor 11 is shown in section, the wire leads 13 and 14 being embedded therein. In FIGURE 2 the bar thermistor 16 is shown with the ends in section to expose the wire leads 17 and 18 that are embedded in the bar adjacent the ends thereof. The thermistors of the foregoing examples are of this type.

Figure 3:
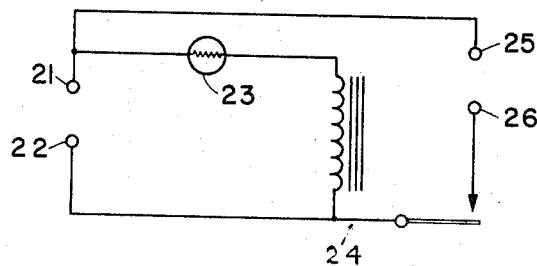
FIGURE 3 is a schematic diagram of a temperature sensing circuit employing a thermistor according to the present invention.

In the circuit diagram illustrated in FIGURE 3 the numerals 21, 22 indicate the input terminals, 23 the thermistor, 24 a relay, and 25, 26 the output terminals. It will be evident that increase in temperature of the thermistor 23 will lower the thermistor resistance and thereby, the voltage across 21, 22 being constant, increase current flow through the coil of the relay, 24. The relay armature is thereby pulled in whereby to complete the circuit to the output terminals 25, 26 which may be connected to suitable apparatus such as an alarm, control, or the like.

Figure 4:
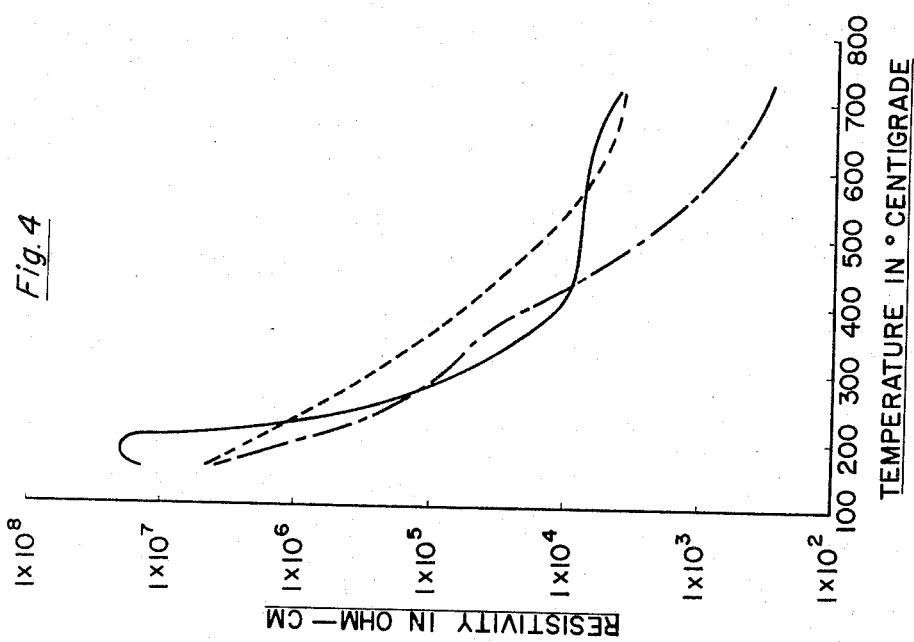
FIGURE 4 is a graphical representation of the variations in resistivity of the thermistor bodies of Examples 1, 2 and 11 with changes in temperature.

In FIGURE 4 the variation in resistivity with change of temperature is shown, for temperatures between 150° C. and about 700° C., for thermistors resulting from Examples 1, 2 and 11. The dashed line represents the characteristics of a thermistor according to Example 1; the broken line represents the characteristics of a thermistor according to Example 2; and the solid line represents the characteristics of a thermistor in accordance with Example 11. The curves in this figure permit convenient comparison of a few of the thermistor bodies described above. It will be seen that all three thermistors have a resistivity at temperatures from about 400° C. to about 700° C. substantially below 1×10$^5$ and at 150° C. above 1×10$^6$. There is thus a range of temperatures at which they would have useful characteristics.

Figure 5:
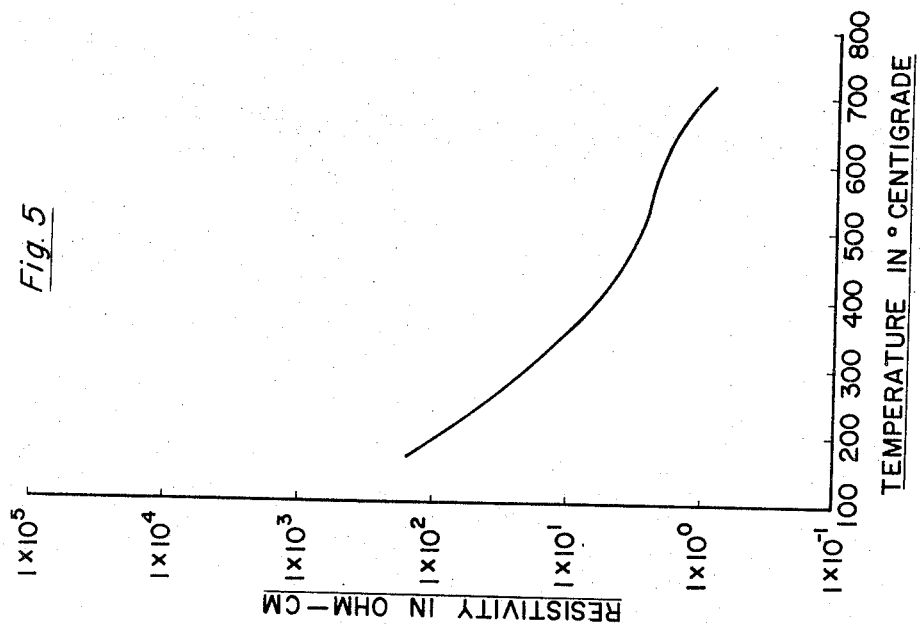
FIGURE 5 is a graphical representation of the variation in resistivity of the body of Example 19 with change in temperature.

FIGURE 5 shows a similar resistivity-temperature curve for the body of Example 19 which contains no TiO$_2$. It is clear that at high temperatures the resistance of this body is so low as to make it virtually useless as a thermistor for operation at such temperatures.

It will be obvious from the foregoing discussion that in producing thermistors according to the present invention from basic mixtures containing stannic oxide and titanium oxide the proportions of these oxides may vary quite widely. Antimony trioxide or Ta$_2$O$_5$ may be added in molal percentages ranging from about 0.1 percent to 5 percent to the $SnO_2$-$TiO_2$ solid solution to function as resistance modifiers. Zinc oxide, found useful in many compositions because of its stabilizing effect, may be used in molal percentages up to about 10 percent of the basic composition. Not only does the zinc oxide tend to increase the consistency of resistivity determinations at high temperatures but it also appears to give a more nearly linear response to changes of temperature, particularly at high temperatures.

Although in the foregoing disclosure the preparation of thermistors according to the present invention in the form of bars is described, it will be understood that by the use of known procedures thermistor bodies comprehended by the invention may be produced in other forms, e.g. as beads, pellets, discs and flakes. Further, the wire leads on such devices may be applied in any known fashion and be of any suitable material, it being understood that in some instances no wire leads directly attached to or mold in the thermistor will be used but that mechanical contact with metal electrodes will be employed. It will also be understood that by proper choice of body shape and size and placement of leads or other contacts, a variety of thermistors each of which may have a different actual resistance may be formed. Thus thermistors suitable for particular circuits may be produced.

It will be evident from the foregoing that the invention of the present application is not to be considered as being restricted to the examples herein but is to be construed as a broad invention comprehending a number of oxidic solid solutions as thermistors.

I claim:
1. A thermistor suitable for use as a high temperature flame sensor which consists of a body and a pair of leads attached thereto, said body consisting essentially of:
   (a) a solid solution of oxides of polyvalent metals represented by the formula $MO_2 \cdot M'O'_2$ where M and M are different and the mol ratio of $MO_2$ to $M'O'_2$ ranges from 98:2 to 2:8 and where M is tin and M' is titanium;
   (b) a resistance modifier consisting of at least one metal oxide selected from the group consisting of antimony trioxide and tantalum pentoxide present in an amount ranging from about 0.1 mol percent to about 5 mol percent with respect to the mols of $MO_2 \cdot M'O'_2$;

said thermistor having a measurable resistivity over a wide range of temperatures up to and including 1000° C. and being characterized by having a resistivity at 600° C. of not more than about $5 \times 10^4$ ohm-cm., a resistivity ratio of from about $3 \times 10^1$ to about $4 \times 10^7$ and a percent resistivity change per degree C. of at least about 0.5.

2. A thermistor as set forth in claim 1 wherein said base mixture consists of 98 mol percent to 60 mol percent of $MO_2$ and 2 mol percent to 40 mol percent of $M'O'_2$.

3. A thermistor as set forth in claim 1 wherein said resistance modifier is antimony trioxide.

4. A thermistor as set forth in claim 1 wherein said resistance modifier is tantalum pentoxide.

5. A thermistor as set forth in claim 1 wherein said body consists essentially of a solid solution of 85 mol percent tin oxide and 15 mol percent titanium oxide, and 0.5 mol percent of antimony trioxide, said thermistor having a resistivity at 600° C. of $6.18 \times 10^3$ ohm-cm., a resistivity ratio of $7.49 \times 10^2$ and a percent resistivity change per degree C. of 1.39.

6. A thermistor as set forth in claim 5 wherein said body includes 3 mol percent of zinc oxide calculated with respect to said solution of metal oxides.

7. A thermistor as set forth in claim 1 wherein said body consists essentially of a solid solution of 98 mol percent tin oxide and 2 mol percent titanium oxide, and 0.2 mol percent of antimony trioxide, said thermistor having a resistivity at 600° C. of 9.8 ohm-cm., a resistivity ratio of $1.15 \times 10^2$ and a percent resistivity change per degree C. of 1.09.

8. A thermistor as set forth in claim 1 wherein from 0 mol percent to 10 mol percent of zinc oxide is included in said body.

References Cited
UNITED STATES PATENTS

| 2,081,894 | 5/1937 | Meyer et al. | 252—519 XR |
| 2,407,750 | 9/1946 | Smith | 252—518 XR |
| 2,490,825 | 2/1949 | Mochel | 252—518 XR |

OTHER REFERENCES

Levin et al.: Phase Diagrams for Ceramists (1956), page 146.

LEON D. ROSDOL, *Primary Examiner.*

SAMUEL H. BLECH, J. D. WELSH, *Examiners.*